(12) United States Patent
Jameson et al.

(10) Patent No.: US 11,086,750 B2
(45) Date of Patent: Aug. 10, 2021

(54) SYSTEMS AND METHODS FOR DETERMINATION OF HEALTH INDICATORS USING RANK CORRELATION ANALYSIS

(71) Applicant: University of Maryland, College Park, College Park, MD (US)

(72) Inventors: Noel J. Jameson, Silver Spring, MD (US); Michael Azarian, Arlington, VA (US)

(73) Assignee: University of Maryland, College Park, College Park, MD (US)

( * ) Notice: Subject to any disclaimer, the term of this patent is extended or adjusted under 35 U.S.C. 154(b) by 21 days.

(21) Appl. No.: 16/091,717

(22) PCT Filed: Apr. 7, 2017

(86) PCT No.: PCT/US2017/026692
§ 371 (c)(1),
(2) Date: Oct. 5, 2018

(87) PCT Pub. No.: WO2017/177190
PCT Pub. Date: Oct. 12, 2017

(65) Prior Publication Data
US 2019/0121715 A1 Apr. 25, 2019

Related U.S. Application Data

(60) Provisional application No. 62/319,696, filed on Apr. 7, 2016.

(51) Int. Cl.
*G06F 11/00* (2006.01)
*G06F 11/34* (2006.01)
*G06F 11/30* (2006.01)

(52) U.S. Cl.
CPC .......... *G06F 11/3452* (2013.01); *G06F 11/00* (2013.01); *G06F 11/008* (2013.01); *G06F 11/3055* (2013.01); *G06F 11/3409* (2013.01)

(58) Field of Classification Search
CPC ............. G06F 11/3452; G06F 11/3409; G06F 11/3055; G06F 11/3058; G06F 11/3072;
(Continued)

(56) References Cited

U.S. PATENT DOCUMENTS 7,444,263 B2 * 10/2008 White ................. G06F 11/3409
700/51
9,658,910 B2 * 5/2017 Poola .................... G06F 11/079
(Continued)

OTHER PUBLICATIONS

IEEE 1000 The Authoritative Dictionary of IEEE Standard Terms, 2000, IEEE Press, Seventh Edition, p. 1026 (Year: 2000).*
(Continued)

*Primary Examiner* — Marc Duncan
(74) *Attorney, Agent, or Firm* — Carter, DeLuca & Farrell LLP; George Likourezos

(57) ABSTRACT

A system that is a target of health monitoring via a computational system, the computational system, and corresponding method for determining health indicators using rank correlation analysis are disclosed. The target system includes a computational system that includes a computing device that acquires data from the target system, generate at least two features from the data acquired from the target system, computes, for each feature, rank correlation of the feature with time, computes the absolute value of each rank correlation coefficient for each feature, confining the range of the absolute value rank correlation coefficients to that from 0 to 1; and chooses at least one feature with a higher relative absolute value rank correlation coefficient as a health or condition indicator for the target system. The target (Continued)

system or the computational system or the method may perform health or condition monitoring on the target system.

41 Claims, 13 Drawing Sheets

(58) Field of Classification Search
CPC .... G06F 11/3075; G06F 11/00; G06F 11/008; G06F 17/15; G06F 17/153; G06F 17/18
See application file for complete search history.

(56) References Cited

U.S. PATENT DOCUMENTS

| | | | |
|---|---|---|---|
| 10,021,130 B2* | 7/2018 | Srivastava | H04L 63/1458 |
| 2004/0204858 A1 | 10/2004 | Brumbaugh | |
| 2006/0052937 A1 | 3/2006 | Zoraster et al. | |
| 2008/0016412 A1 | 1/2008 | White et al. | |
| 2011/0010099 A1 | 1/2011 | Adourian et al. | |
| 2011/0119040 A1 | 5/2011 | McLennan | |
| 2012/0271594 A1* | 10/2012 | Yan | G06F 11/008 702/183 |
| 2016/0340059 A1* | 11/2016 | Pettre | G05B 23/024 |
| 2017/0102978 A1* | 4/2017 | Pallath | G06F 11/0787 |
| 2017/0218456 A1* | 8/2017 | Bartlett | C12Q 1/6886 |
| 2019/0188584 A1* | 6/2019 | Rao | G06F 16/215 |

OTHER PUBLICATIONS

Gauthier, Thomas D., Detecting Trends Using Spearman's Rank Correlation Coefficient, 2001, AEHS, all pages (Year: 2001).*
Zhou, Yapeng et al., A novel health indicator for on-line lithium-ion batteries remaining useful life prediction, 2016, Elsevier B.V. (Year: 2016).*
Cotroneo, Domenico et al., Software Aging Analysis of the Android Mobile OS, 2016, IEEE (Year: 2016).*
International Search Report and Written Opinion of the International Searching Authority corresponding to Appln. No. PCT/US17/26692 dated Jul. 17, 2017, 17 pages.
Supplementary European Search Report for EP Application 17779945.9 dated Nov. 27, 2019.
Carino J. et al. "Remaining Useful Life Estimation of Ball Bearings by Means of Monotonic Score Calibration", 2015 IEEE International Conference on Industrial Technology (ICIT), IEEE, Mar. 17, 2015, pp. 1753-1758.
Anonymous: "5.12 Sample Correlation Using 1-15 Pearson or Spearman Coefficients", Mar. 1, 2016, Retrieved from the Internet, URL:https://web.archive.org/web/20160301021239/https://www.itrcweb.org. pp. 1-3.

* cited by examiner

SYSTEMS AND METHODS FOR DETERMINATION OF HEALTH INDICATORS USING RANK CORRELATION ANALYSIS

CROSS-REFERENCE TO RELATED APPLICATIONS

This application claims the benefit of, and priority to, U.S. Provisional Patent Application 62/319,696, filed on Apr. 7, 2016, "Use of a Rank Correlation Analysis for Determination of Health Indicators," by Noel Jameson et al., the entire content of which is incorporated by reference herein.

BACKGROUND

1. Technical Field

The present disclosure relates to systems, components, structures and organisms that are subject health or condition monitoring and more particularly to ranking health indicators for such systems, components, structures and organisms.

2. Discussion of Related Art

Data-driven prognostic and diagnostic methods are used to determine when a system is degrading in some fashion, how it is degrading, and to predict when the system will fail. The systems to which they can be applied can range from relatively small and simple devices to complex multifunctional machine or living organisms. These methods rely on indicators that provide information regarding the health of the system; these indicators are referred to herein as health indicators or condition indicators. Health is defined herein as the proximity of a system to its "nominal" operating state where "nominal" may be considered equivalent to intended, initial, expected, or acceptable depending on the application.

Data on physical parameters or information extracted from those parameters constitute features that are frequently gathered to characterize the operating state of such systems. Multiple features may be monitored to characterize a single system. In some cases, a separate sensor may be needed to measure each feature, while in other cases multiple features can be extracted from the measurements made using a single sensor. For example, temperature, pressure, and vibration amplitude typically each require a dedicated sensor for their measurement. However, it is possible to process the vibration data obtained from an accelerometer to obtain the magnitude associated with each of many frequencies, each of which can be treated as a separate feature.

Similarly, impedance of electrical equipment may be measured using a specialized meter. Since impedance is a measurement made using alternating current, the impedance measured at each specific frequency may be regarded as a feature. Occasionally, a single feature may suffice to serve as a health indicator, if that feature provides information that is directly reflective of the extent of degradation of the system. More commonly, many system parameters are monitored and a method is required by which to extract from measurements of these features the desired information on the health and likelihood of failure of the overall system.

SUMMARY

To address the foregoing disadvantages of the prior art, the present disclosure relates to a system that is a target of health monitoring via a computational system. The target system includes a computational system that includes a computing device including a processor and a memory storing instructions which, when executed by the processor, cause the computing device to acquire data from at least one of at least one target system; or at least one component of the at least one target system or at least one sub-component of the at least one component of the at least one target system, or combinations thereof; generate at least two features from the data acquired from the at least one of at least one target system; or at least one component of the at least one other target system or at least one sub-component of the at least one component of the at least one target system, or combinations thereof; compute, for each feature, rank correlation of the feature with time; compute the absolute value of each rank correlation coefficient for each feature, confining the range of the absolute value rank correlation coefficients to that from 0 to 1; and choose at least one feature with a higher relative absolute value rank correlation coefficient as a health or condition indicator for the at least one of at least one target system; or at least one component of the at least one target system or at least one sub-component of the at least one component of the at least one target system, or combinations thereof.

The system may further include causing the computing device to use at least one feature with the highest absolute value of rank correlation coefficient as a health or condition indicator to perform health or condition monitoring on the at least one of at least one target system, or at least one component of the at least one target system, or at least one sub-component of the at least one component of the at least one target system, or combinations thereof.

In an embodiment, the computing, for each feature, of the rank correlation with time may include performing a Spearman correlation analysis.

In an embodiment, the target system may include an electrical system, or an electromechanical system, or a mechanical system or an assembly of components or sub-components or combinations thereof.

In an embodiment, the electrical system, or electromechanical system, or mechanical system or assembly of components or sub-components may include an aerospace structure or a maritime structure or combinations thereof.

In an embodiment, the aerospace structure may include an aircraft, or a missile, or a helicopter, or a drone and wherein the maritime structure includes a boat, or a surface ship, or a submarine, or a barge, or a water vessel or combinations thereof.

In an embodiment, the target system may include a civil structure.

In an embodiment, the civil structure may include a road, or a building, or a bridge or combinations thereof.

In an embodiment, the target system may include a bio-organism.

In an embodiment, the computing device may include a processor and memory storing instructions which, when executed by the processor, further cause the computing device or a user to: apply the at least one feature with a higher relative absolute value rank correlation coefficient as a health or condition indicator chosen for the at least one of at least one target system; or at least one component of the at least one target system or at least one sub-component of the at least one component of the at least one target system, or combinations thereof to monitor as a health indicator for at least one other target system, or at least one other component of the at least one other target system or at least one other sub-component of the at least one other component of the at least one other target system, wherein the at least one other target system, or at least one other component of the at least one other target system or at least one other sub-component of the at least one other component of the at least one other target system is analogous to but distinct from the at least one of at least one target system; or at least one component of the at least one target system or at least one sub-component of the at least one component of the at least one target system, or combinations thereof for which the at least one feature with a higher relative absolute value rank correlation coefficient as a health or condition indicator was chosen.

The present disclosure relates also to a computational system for health monitoring of a target system. The computational system includes a computational system that includes a computing device including a processor and a memory storing instructions which, when executed by the processor, cause the computing device to acquire data from at least one of at least one target system; or at least one component of the at least one target system or at least one sub-component of the at least one component of the at least one target system, or combinations thereof; generate at least two features from the data acquired from the at least one of at least one target system; or at least one component of the at least one other target system or at least one sub-component of the at least one component of the at least one target system, or combinations thereof; compute, for each feature, rank correlation of the feature with time; compute the absolute value of each rank correlation coefficient for each feature, confining the range of the absolute value rank correlation coefficients to that from 0 to 1; and choose at least one feature with a higher relative absolute value rank correlation coefficient as a health or condition indicator for the at least one of at least one target system; or at least one component of the at least one target system or at least one sub-component of the at least one component of the at least one target system, or combinations thereof.

The system may further include causing the computing device to use at least one feature with the highest absolute value of rank correlation coefficient as a health or condition indicator to perform health or condition monitoring on the at least one of at least one target system, or at least one component of the at least one target system, or at least one sub-component of the at least one component of the at least one target system, or combinations thereof.

In an embodiment, the computing, for each feature, of the rank correlation with time may include performing a Spearman correlation analysis.

In an embodiment, the target system may include an electrical system, or an electromechanical system, or a mechanical system or an assembly of components or sub-components or combinations thereof.

In an embodiment, the electrical system, or electromechanical system, or mechanical system or assembly of components or sub-components may include an aerospace structure or a maritime structure or combinations thereof.

In an embodiment, the aerospace structure may include an aircraft, or a missile, or a helicopter, or a drone and wherein the maritime structure includes a boat, or a surface ship, or a submarine, or a barge, or a water vessel or combinations thereof.

In an embodiment, the target system may include a civil structure.

In an embodiment, the civil structure may include a road, or a building, or a bridge or combinations thereof.

In an embodiment, the target system may include a bio-organism.

In an embodiment, the computing device may include a processor and memory storing instructions which, when executed by the processor, further cause the computing device or a user to: apply the at least one feature with a higher relative absolute value rank correlation coefficient as a health or condition indicator chosen for the at least one of at least one target system; or at least one component of the at least one target system or at least one sub-component of the at least one component of the at least one target system, or combinations thereof to monitor as a health indicator for at least one other target system, or at least one other component of the at least one other target system or at least one other sub-component of the at least one other component of the at least one other target system, wherein the at least one other target system, or at least one other component of the at least one other target system or at least one other sub-component of the at least one other component of the at least one other target system is analogous to but distinct from the at least one of at least one target system; or at least one component of the at least one target system or at least one sub-component of the at least one component of the at least one target system, or combinations thereof for which the at least one feature with a higher relative absolute value rank correlation coefficient as a health or condition indicator was chosen.

The present disclosure relates also to a non-transitory computer-readable storage medium including instructions which, when executed by a computer, cause the computer to: acquire data from at least one of at least one target system; or at least one component of the at least one target system or at least one sub-component of the at least one component of the at least one target system, or combinations thereof; generate at least two features from the data acquired from the at least one of at least one target system; or at least one component of the at least one other target system or at least one sub-component of the at least one component of the at least one target system, or combinations thereof; compute, for each feature, rank correlation of the feature with time; compute the absolute value of each rank correlation coefficient for each feature, confining the range of the absolute value rank correlation coefficients to that from 0 to 1; and choose at least one feature with a higher relative absolute value rank correlation coefficient as a health or condition indicator for the at least one of at least one target system; or at least one component of the at least one target system or at least one sub-component of the at least one component of the at least one target system, or combinations thereof.

The system may further include causing the computing device to use at least one feature with the highest absolute value of rank correlation coefficient as a health or condition indicator to perform health or condition monitoring on the at least one of at least one target system, or at least one component of the at least one target system, or at least one sub-component of the at least one component of the at least one target system, or combinations thereof.

In an embodiment, the computing, for each feature, of the rank correlation with time may include performing a Spearman correlation analysis.

In an embodiment, the target system may include an electrical system, or an electromechanical system, or a mechanical system or an assembly of components or sub-components or combinations thereof.

In an embodiment, the electrical system, or electromechanical system, or mechanical system or assembly of components or sub-components may include an aerospace structure or a maritime structure or combinations thereof.

In an embodiment, the aerospace structure may include an aircraft, or a missile, or a helicopter, or a drone and wherein the maritime structure includes a boat, or a surface ship, or a submarine, or a barge, or a water vessel or combinations thereof.

In an embodiment, the target system may include a civil structure.

In an embodiment, the civil structure may include a road, or a building, or a bridge or combinations thereof.

In an embodiment, the target system may include a bio-organism.

In an embodiment, the computing device may include a processor and memory storing instructions which, when executed by the processor, further cause the computing device or a user to: apply the at least one feature with a higher relative absolute value rank correlation coefficient as a health or condition indicator chosen for the at least one of at least one target system; or at least one component of the at least one target system or at least one sub-component of the at least one component of the at least one target system, or combinations thereof to monitor as a health indicator for at least one other target system, or at least one other component of the at least one other target system or at least one other sub-component of the at least one other component of the at least one other target system, wherein the at least one other target system, or at least one other component of the at least one other target system or at least one other sub-component of the at least one other component of the at least one other target system is analogous to but distinct from the at least one of at least one target system; or at least one component of the at least one target system or at least one sub-component of the at least one component of the at least one target system, or combinations thereof for which the at least one feature with a higher relative absolute value rank correlation coefficient as a health or condition indicator was chosen.

In an embodiment, the non-transitory computer readable storage medium resides on a system that is a target of health monitoring via the instructions when executed by the computer.

The present disclosure relates also to a method for health monitoring of a target system. The method includes acquiring data from at least one of at least one target system; or at least one component of the at least one target system or at least one sub-component of the at least one component, or combinations thereof; generating at least two features from the data acquired from the at least one of at least one target system; or at least one component of the at least one target system or at least one sub-component of the at least one component, or combinations thereof; computing, for each feature, rank correlation of the feature with time; computing the absolute value of each rank correlation coefficient for each feature, confining the range of absolute value rank correlation coefficient values to that from 0 to 1; and choosing at least one feature with a higher relative absolute value rank correlation coefficient as a health indicator for the at least one target system; at least one component of the at least one target system or at least one sub-component of the at least one component, or combinations thereof.

In an embodiment, the method may further include using at least one feature with the highest absolute value of rank correlation coefficient as a health or condition indicator to perform health or condition monitoring on the at least one of at least one target system, or at least one component of the at least one target system, or at least one sub-component of the at least one component of the at least one target system, or combinations thereof.

In an embodiment, the computing, for each feature, of the rank correlation with time may include performing a Spearman correlation analysis.

In an embodiment, the acquiring of data from the at least one of at least one target system; or at least one component of the at least one target system or at least one sub-component of the at least one component or combinations thereof may include acquiring of data from an electrical system, or from an electromechanical system, or from a mechanical system or from an assembly of components or sub-components or combinations thereof.

In an embodiment, the acquiring of data from an electrical system, or from an electromechanical system, or from a mechanical system or from an assembly of components or sub-components may include acquiring data from an aerospace structure or a maritime structure or combinations thereof.

In an embodiment, the acquiring data from an aerospace structure may include acquiring data from an aircraft, or a missile, or a helicopter, or a drone and wherein the acquiring data from a maritime structure includes acquiring data from a boat, or a surface ship, or a submarine, or a barge, or a water vessel or combinations thereof.

In an embodiment, the acquiring of data from the at least one of at least one target system; or at least one component of the at least one target system or at least one sub-component of the at least one component or combinations thereof may include acquiring of data from a civil structure.

In an embodiment, the acquiring of data from a civil structure may include acquiring of data from a road, or a building, or a bridge or combinations thereof.

In an embodiment, the acquiring of data from the at least one of at least one target system; or at least one component of the at least one target system or at least one sub-component of the at least one component or combinations thereof may include acquiring of data from a bio-organism.

In an embodiment, the method may further include applying the at least one feature with a higher relative absolute value rank correlation coefficient as a health or condition indicator chosen for the at least one of at least one target system; or at least one component of the at least one target system or at least one sub-component of the at least one component of the at least one target system, or combinations thereof to monitor as a health indicator for at least one other target system, or at least one other component of the at least one other target system or at least one other sub-component of the at least one other component of the at least one other target system, wherein the at least one other target system, or at least one other component of the at least one other target system or at least one other sub-component of the at least one other component of the at least one other target system is analogous to but distinct from the at least one of at least one target system; or at least one component of the at least one target system or at least one sub-component of the at least one component of the at least one target system, or combinations thereof for which the at least one feature with a higher relative absolute value rank correlation coefficient as a health or condition indicator was chosen.

BRIEF DESCRIPTION OF THE DRAWINGS

The above-mentioned advantages and other advantages will become more apparent from the following detailed description of the various exemplary embodiments of the present disclosure with reference to the drawings wherein.

DETAILED DESCRIPTION

Figure 1:
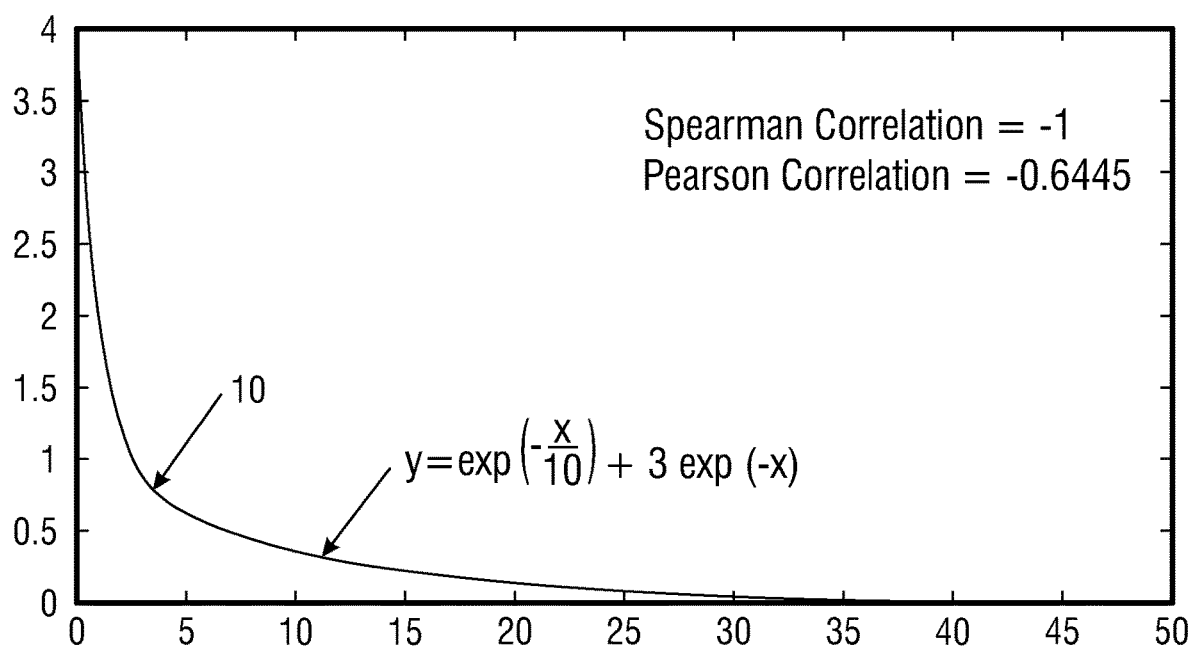
FIG. 1 illustrates a Pearson and Spearman correlation analysis for a nonlinear function.

For the purposes of promoting an understanding of the principles of the present disclosure, reference will now be made to the exemplary embodiments illustrated in the drawings, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the scope of the present disclosure.

The word "exemplary" is used herein to mean "serving as an example, instance, or illustration." Any embodiment described herein as "exemplary" is not necessarily to be construed as preferred or advantageous over other embodiments.

It is to be understood that the method steps described herein need not necessarily be performed in the order as described. Further, words such as "thereafter," "then," "next," etc., are not intended to limit the order of the steps. Such words are simply used to guide the reader through the description of the method steps.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, tablets, portable/personal digital assistants, and other devices that facilitate communication of information between end-users within a network.

The general features and aspects of the present disclosure remain generally consistent regardless of the particular purpose. Further, the features and aspects of the present disclosure may be implemented in system in any suitable fashion, e.g., via the hardware and software configuration of system or using any other suitable software, firmware, and/or hardware. For instance, when implemented via executable instructions, such as the set of instructions, various elements of the present disclosure are in essence the code defining the operations of such various elements. The executable instructions or code may be obtained from a computer-readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media may include any medium that may store or transfer information.

In order to produce accurate and timely diagnostic and prognostic information about a system, one or more sensitive indicators reflecting the health of the system is required. The present disclosure relates to a computational system for deciding on and/or ranking the health indicators of a system, a structure or a bio-organism such as a person, an animal or a plant or a micro-organism, or combinations thereof, hereinafter each of the foregoing generically referred to as a target system, or combinations thereof, that are sensitive to the target system's health when supplied with data on multiple features that could each potentially serve as a health indicator. The target system may include components and sub-components, or combinations thereof, that are evaluated by the computational system and method for deciding on and/or ranking the health indicators of those components and sub-components. In addition, as defined herein, a system that is a target for health monitoring via a computational system for health monitoring of a target system via the method or methods disclosed herein is also defined as a target system even while also including the computational system therein to perform the target health monitoring functions on the system itself.

In the past, others have combined together a large set of health indicators to form a smaller set of health indicators using dimensional reduction methods like Mahalanobis distance analysis or principal component analysis (PCA). However, dimensional reduction methods can be computationally demanding. For example, Mahalanobis distance and PCA can be computationally demanding due to the necessity of inverting a covariance matrix; in many cases, the covariance matrix is singular, and thus unable to be inverted.

Furthermore, when using PCA, the data on multiple physical parameters are combined together leading to a set of features or health indicators that lose their physical meaning. What is needed is a computational system and corresponding method to decide the best health indicator or indicators by quantifying the efficacy of given features (or potential health indicators) with regard to their ability to track with degradation time. Ideally, the best feature will retain its physical meaning, thus allowing for a physics-of-failure interpretation. Further, the computational system and method must be capable of quick computation, as prognostic and health management or condition-based maintenance decisions can be time critical.

In embodiments of the present disclosure, the computational system and corresponding method, or a system that is a target of health monitoring via the computational system, entail using a rank correlation analysis to: 1) quantify the extent to which a given health indicator tracks with the target system's aging or degradation time; and 2) adaptively narrow the feature space (or number of potential health indicators) to only those features that are best suited to serve as health indicators.

As defined herein, time is generically used to indicate calendar time, cycles, usage time, or degradation time.

Rank correlation does not require the inversion of a matrix, and this method produces a set of features that retain their physical meaning, making this method more amenable to a physics-of-failure analysis of the target system and providing more direct diagnostic information about its degradation.

The differences between the Spearman correlation coefficient, which is a rank correlation, and the Pearson correlation coefficient, which is not a rank correlation, are illustrated in the plot shown in FIG. 1.

More particularly, FIG. 1 illustrates a graphical plot 10 of a Pearson and Spearman correlation analysis for a nonlinear function $y=e^{-x/10}+3e^{-x}$. Assuming the variable y was indicative of system or component health, using the Spearman rank correlation coefficient in this instance would provide a stronger indication that the feature indicated by the variable x could serve as a health indicator.

In one embodiment, the rank correlation coefficient is computed in conjunction with investigatory tests where a target component or system is outfitted or equipped with one or more sensors, each sensor producing data pertaining to the performance of the system. As the component or system may undergo a variety of failure modes and/or mechanisms, the features obtained using the aforementioned sensor or sensors may provide information that is more or less pertinent to each failure mode and/or mechanism. By using the rank correlation analysis according to the present disclosure, the user is equipped to analyze data from experiments meant to elicit different failure modes and/or mechanisms and discover which feature or features are best suited to track the degradation of the component or system for a given failure mechanism. In this way, the sensors and features selected can be used for the system or components used in the tests or for other instances of distinctly separate, but analogous systems or components.

In another embodiment, the rank correlation coefficient is computed in conjunction with data acquired from one or more sensors in and/or on a fielded system, component, or subcomponent. Using the rank correlation coefficient, a user may perform rank correlation computations, which are updated as additional data become available. This provides the ability to quantify the health of the system by observing which data best correlates with the usage time and comparing with available diagnostic or prognostic models. It is also possible to use the highest correlated features to construct a model to predict the future value of said feature, thus enabling data-driven prognostics. In this embodiment, there is no work needed prior to the fielding of the component or system.

Figure 2:
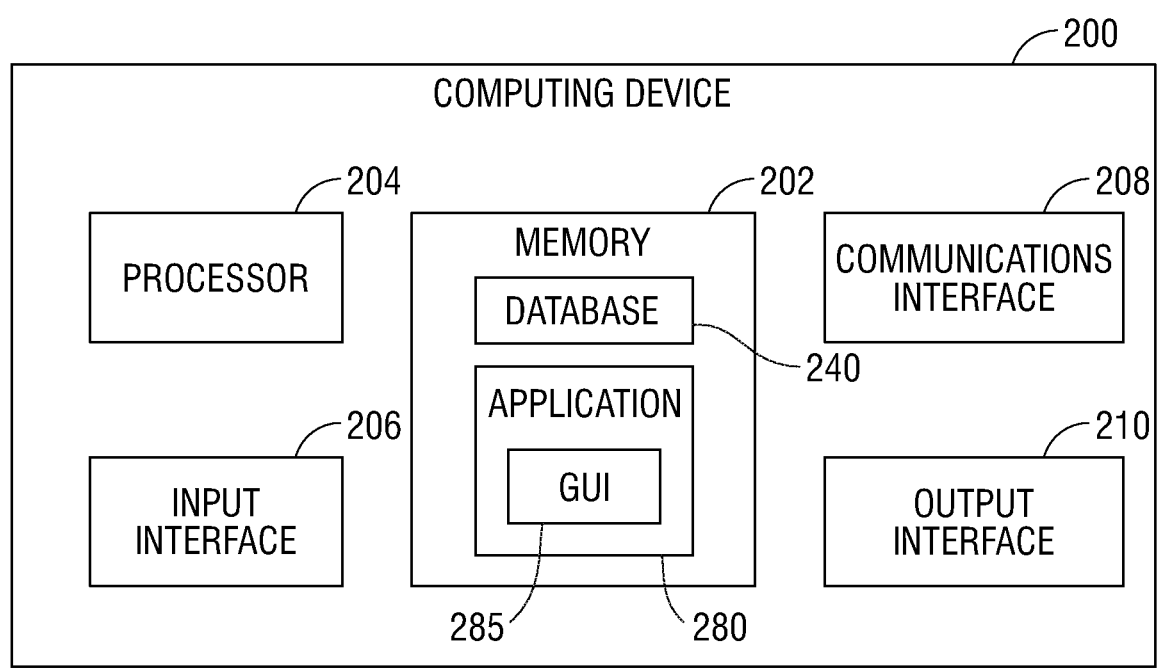
FIG. 2 is a schematic diagram of a computing device forming part of a computational system for health monitoring of a target system according to embodiments of the present disclosure.
Figure 3:
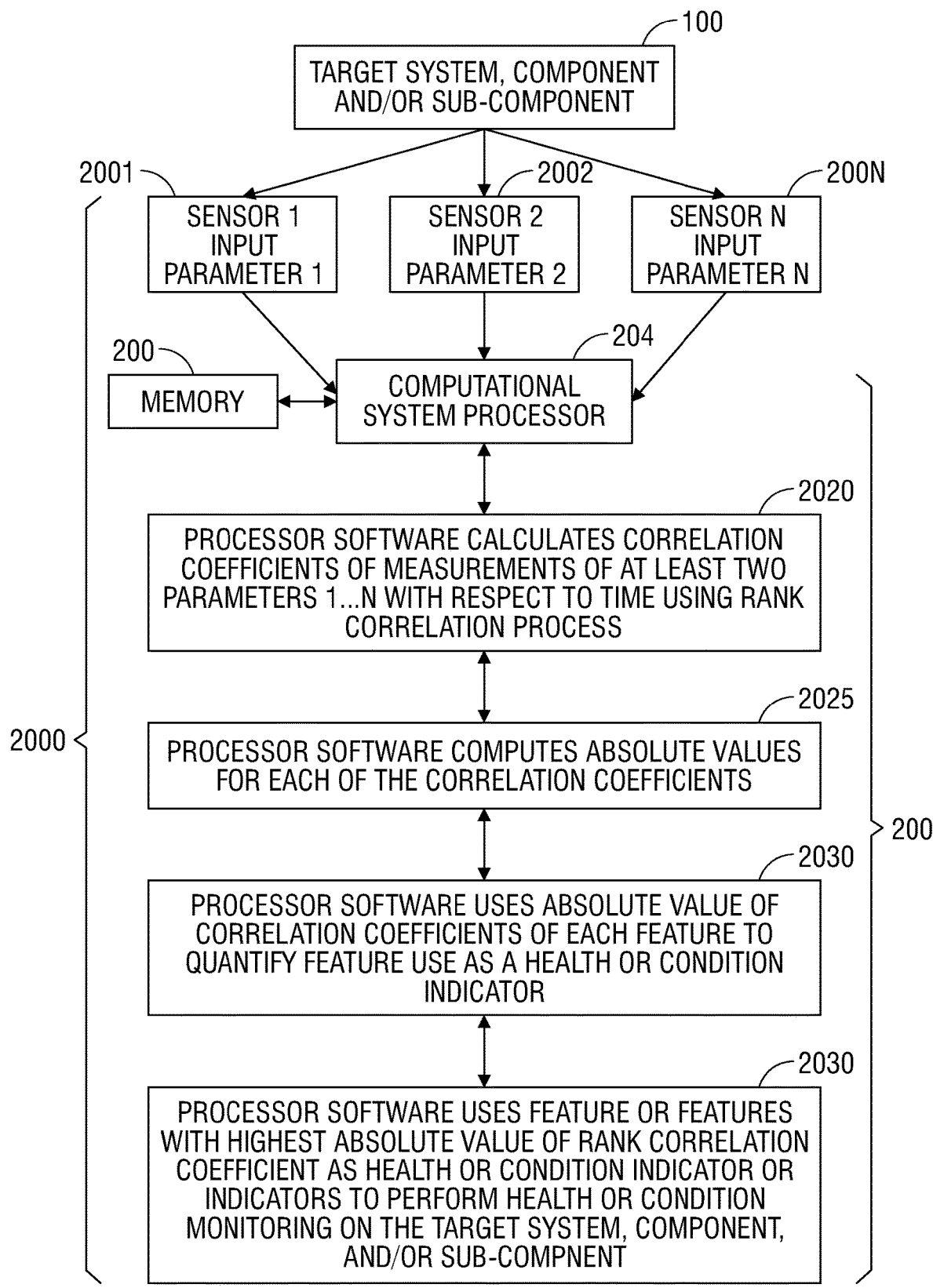
FIG. 3 is a schematic diagram of a computational system for health monitoring of a target system according to embodiments of the present disclosure.

Turning now to FIG. 2, there is shown a schematic diagram of computing device 200 forming part of computational system 2000 discussed further in FIG. 3, according to an embodiment of the present disclosure. Computing device 200 includes a memory 202 and a processor 204, and may include an input interface 206, a communications interface 208, and/or an output interface 210. Memory 202 stores a database 240 and an application 280. Application 280 includes instructions that, when executed by processor 204, cause computing device 200 to perform various functions, as described below. Application 280 may further include graphical user interface (GUI) instructions 285 which, when executed by processor 204, cause computing device 200 to generate one or more GUIs (not shown in FIG. 2), such as, for example, the example GUI shown in FIG. 4. Database 240 stores data relating to the features or health indicators analyzed for the ranking correlation.

Memory 202 may include any non-transitory computer-readable storage medium for storing data and/or software that is executable by processor 204 and which controls the operation of computing device 200. In an embodiment, memory 202 may include one or more solid-state storage devices such as flash memory chips. Alternatively, or in addition to the one or more solid-state storage devices, memory 202 may include one or more mass storage devices connected to the processor 204 through a mass storage controller (not shown in FIG. 2) and a communications bus (not shown in FIG. 2). Although the description of computer-readable media included herein refers to a solid-state storage, it should be appreciated by those skilled in the art that computer-readable storage media can be any available media that can be accessed by processor 204. That is, computer-readable storage media may include non-transitory, volatile and non-volatile, removable and non-removable media implemented in any method or technology for storage of information such as computer-readable instructions, data structures, program modules, or other data. For example, computer-readable storage media may include RAM, ROM, EPROM, EEPROM, flash memory or other solid state memory technology, CD-ROM, DVD, Blu-Ray or other optical storage, magnetic cassettes, magnetic tape, magnetic disk storage or other magnetic storage devices, or any other medium which can be used to store the desired information and which can be accessed by computing device 200.

Input interface 206 may be a mouse, keyboard, or other hand-held controller, foot pedal, touch screen, voice interface, and/or any other device or interface by means of which a user may interact with computing device 200. Communications interface 208 may be configured to connect to a network such as a local area network (LAN) consisting of a wired network and/or a wireless network, a wide area network (WAN), a wireless mobile network, a Bluetooth network, and/or the internet. Output interface 210 may be a screen or other display device usable to output images or data by computing device 200.

Figure 4A:
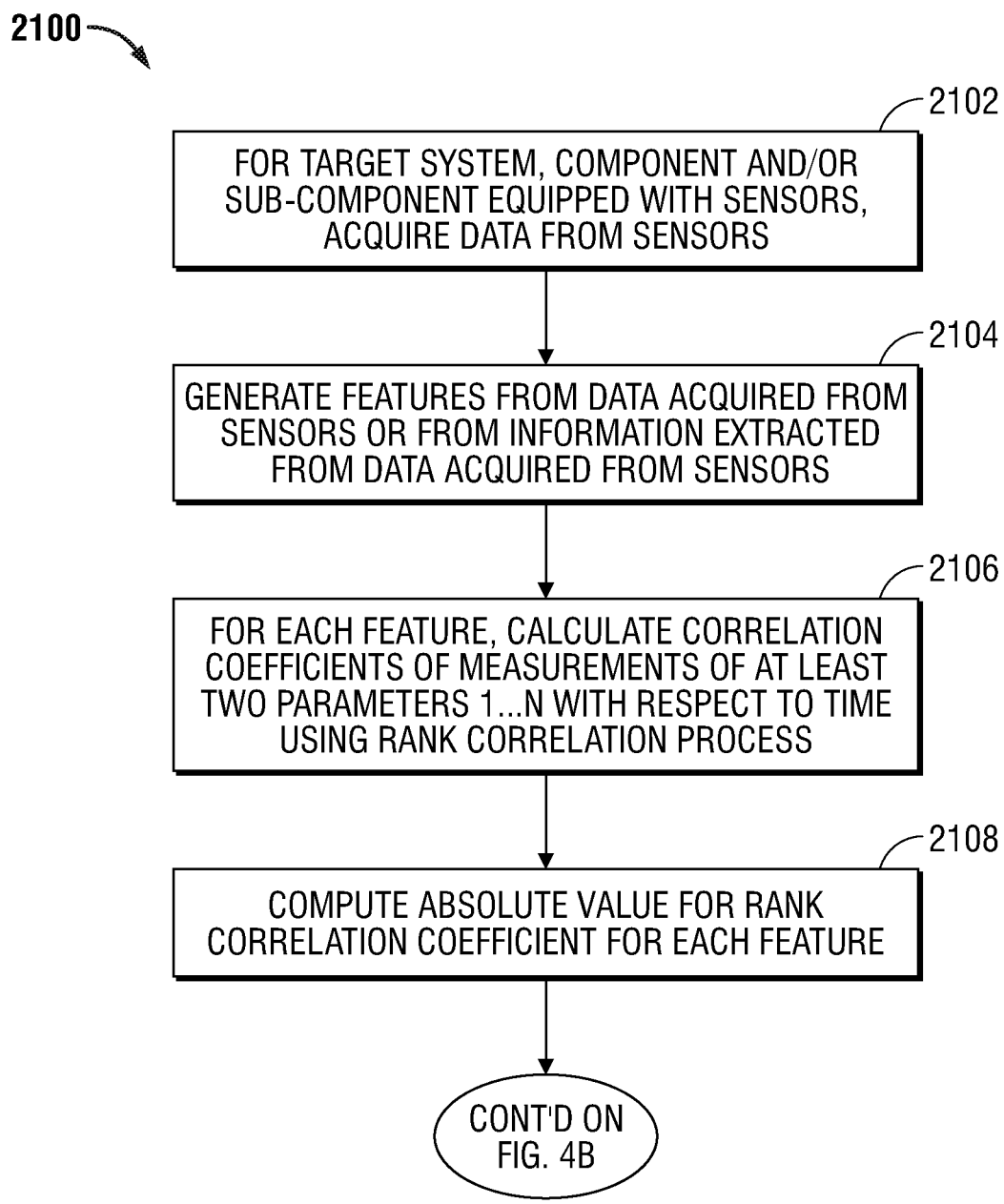
FIG. 4A is a Flow chart showing the determination of the best health indicator using the rank correlation method.
Figure 4B:
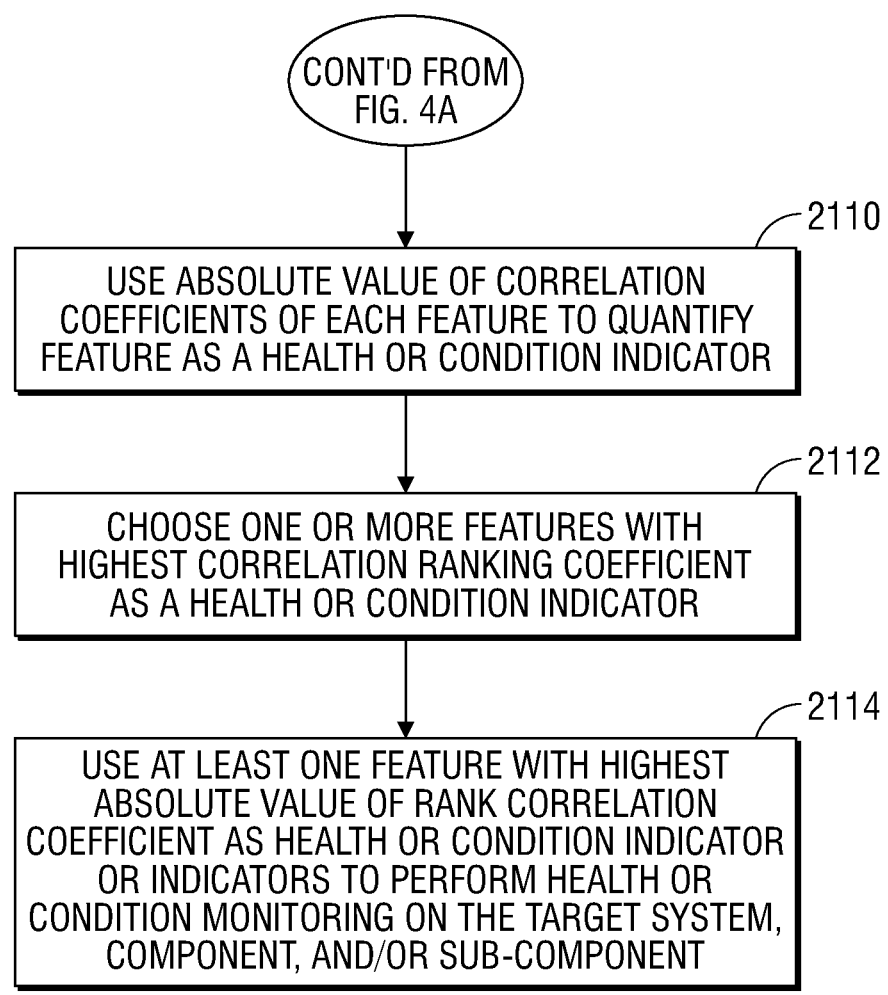
FIG. 4B is a continuation of the flow chart of FIG. 4A.

Turning now to FIGS. 3 and 4, FIG. 3 illustrates computational system 2000 and FIG. 4 illustrates corresponding method 2100 for deciding on and/or ranking the health indicators of a system, a structure or a bio-organism such as a person, an animal or a plant or a micro-organism, hereinafter each of the foregoing generically referred to as a target system, that are sensitive to the target system's health when supplied with data on multiple features that could each potentially serve as a health indicator.

More particularly, in FIG. 3, at least one target system, or at least one component or at least one sub-component or combinations thereof, as defined above, is or are outfitted or equipped with sensors providing one or more of sensor input parameter 1 (2001), sensor input parameter 2 (2002) . . . sensor input parameter N (200N). The sensor input parameters 1, 2 . . . N (2001, 2002 . . . 200N) are in communication with computational system 2000 directly via computational device 200 and indirectly in communication with memory 202 via the computational system processor 204. The sensors that sense the sensor input parameters sensor input parameter 1 (2001), sensor input parameter 2 (2002) . . . sensor input parameter N (200N) are not explicitly shown and may or may not be included as part of the computational system 2000. The sensors are mounted on the one or more target systems, or one or more components, or one or more sub-components, or combinations thereof thereby providing the sensor input parameter 1 (2001), sensor input parameter 2 (2002) . . . sensor input parameter N (200N).

In FIG. 4, step 2102 includes, for target system 100 or a component or sub-component of target system 100 that is equipped with sensors, acquiring data from the sensors.

Step 2104 includes generating features from data acquired from sensors or from information extracted from data acquired from sensors.

In FIG. 3, in action 2020, the processor software calculates correlation coefficients of measurements of at least two parameters 1 . . . N with respect to time using a rank correlation process.

Analogously, in FIG. 4, step 2106 includes, for each feature, calculating correlation coefficients of measurements of at least two parameters 1 . . . N with respect to time using the rank correlation process.

In FIG. 3, in action 2025, the processor software computes the absolute values for each of the correlation coefficients.

Analogously, in FIG. 4, step 2108 includes, computing the absolute value for the rank correlation coefficient for each feature.

In FIG. 3, in action 2030, the processor software uses the absolute value of the correlation coefficients of each feature to quantify use of that feature as a health indicator.

Analogously, in FIG. 4, step 2110 includes using the absolute value of the correlation coefficients of each feature to quantify that feature as a health or condition monitor.

Step 2112 includes choosing one or more features with the highest correlation ranking coefficient as a health or condition monitor.

In FIG. 3, in action 2035, the processor software may use the feature or features with the highest absolute value of rank correlation coefficients as a health or condition indicator or indicators to perform health or condition monitoring on the target system, component, and/or sub-component.

In FIG. 4, the method 2100 may include step 2114, wherein step 2114 includes using the feature or features with the highest absolute value of rank correlation coefficients as a health or condition indicator or indicators to perform health or condition monitoring on the target system, component, and/or sub-component.

It should be noted that in FIG. 3, double arrows are utilized to indicate that data transmission may occur in directions to and from the computational system processor 204 and memory 202 to execute the actions 2020, 2025, 2030 and 2035.

Further, it should be noted that the computational system 2000 and the target system 100 may be either in proximity to one another or remotely located from one another and the data acquisition can occur over time and be wirelessly transmitted or be hard-wired depending on the particular application. Also, the target system may be an already operational system and deployed in the field or a working location such as an industrial, commercial, or residential facility or may be one which will be deployed and operational in the future.

In addition, those skilled in the art that a user or the computing device 200 or the computational system 2000 may apply the at least one feature with a higher relative absolute value rank correlation coefficient as a health or condition indicator chosen for the at least one of at least one target system 100, or at least one component of the at least one target system 100 or at least one sub-component of the at least one component of the at least one target system 100, or combinations thereof to monitor as a health indicator for at least one other target system, or at least one other component of the at least one other target system or at least one other sub-component of the at least one other component of the at least one other target system, or combinations thereof.

The at least one other target system, or at least one other component of the at least one other target system or at least one other sub-component of the at least one other component of the at least one other target system, or combinations thereof, is analogous to but distinct from the at least one of at least one target system 100, or at least one component of the at least one target system 100 or at least one sub-component of the at least one component of the at least one target system 100, or combinations thereof for which the at least one feature with a higher relative absolute value rank correlation coefficient as a health or condition indicator was chosen.

In further embodiments, those skilled in the art may also apply the one or more health indicators chosen to one or more non-analogous target systems.

Example 1

As an example, one may consider the target system to include an electromagnetic coil, wherein frequency dependent impedance measurements are features that constitute a set of potential health indicators. In the past, others looked only at the resonant frequency of the coil for health information regarding the electromagnetic coil insulation. This is a misleading choice because although the resonant frequency is an easily noticed feature, it is ultimately not the best choice for an insulation health indicator [1]. In order to locate where on the frequency spectrum the impedance measurements best track the lifetime of the coil insulation, a rank correlation analysis tool, the Spearman rank correlation coefficient, can be utilized. The Spearman rank correlation coefficient can be used to measure linear or non-linear monotonic relationships between two variables. Hence, the measure is more general than the Pearson correlation coefficient, which measures only the linear correlation between two variables and is not a rank correlation analysis tool. Other types of rank correlation analysis could be equally effective. For a dataset of size n and where each point is distinct and non-repeated, the Spearman rank correlation coefficient is calculated as:

$$\rho_{Sp} = 1 - \frac{6}{n(n^2-1)}\sum_{i=1}^{n}d_i^2 \qquad \text{Eq. 1}$$

In this computation, the raw samples, $X_i$, $Y_i$, are converted into ranks $x_i$, $y_i$, and $d_i = x_i - y_i$ is the distance between the ranks. Identical values (rank ties or value duplicates) are assigned a rank equal to the average of their positions in the ascending order of the values. The Spearman correlation coefficient ranges from +1 to −1 such that when $\rho_{sp} = +1(-1)$, each of the variables is a perfect monotonically increasing (decreasing) function of the other. In this manner, a variable for which the Spearman correlation coefficient is close to +1 is equally valuable as a health indicator as one that has a Spearman correlation coefficient close to −1. This is mathematically equivalent to taking the highest values of the Spearman correlation coefficient after taking the absolute values. Similar considerations apply when using other rank correlation measures such as the Kendall rank correlation measure, or related measures.

Figure 5A:
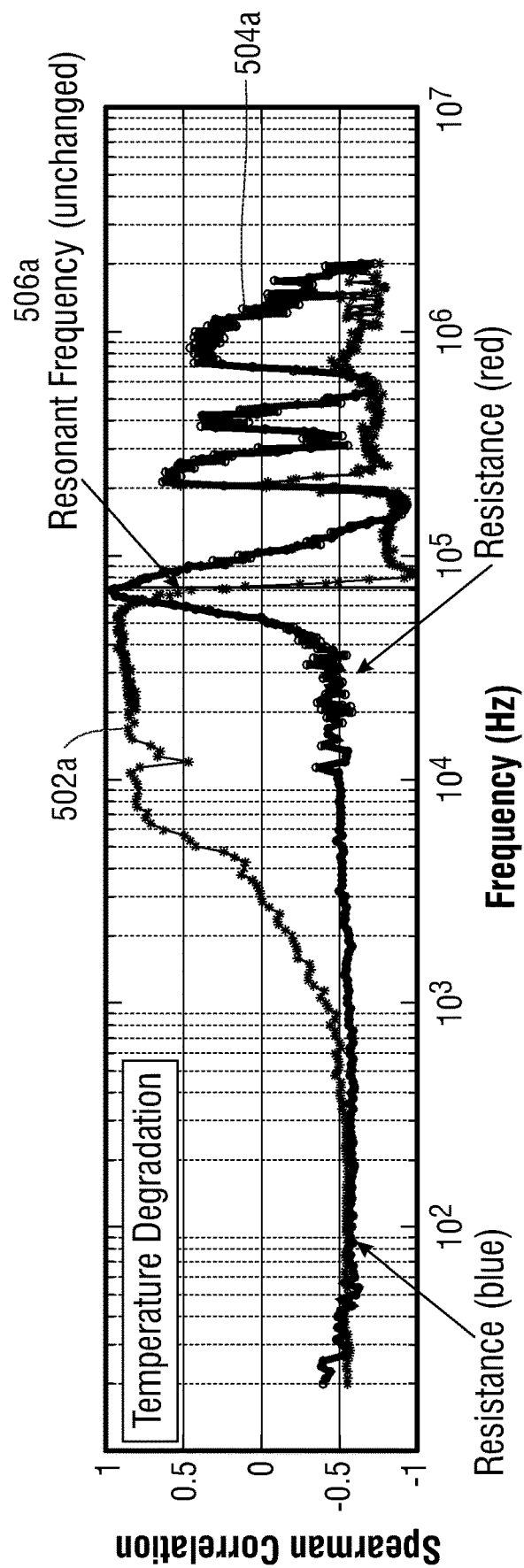
FIG. 5A illustrates a Spearman correlation spectrum plot for temperature degradation showing the differences in the frequency specific directional changes of the resistance and reactance terms according to embodiments of the present disclosure.
Figure 5B:
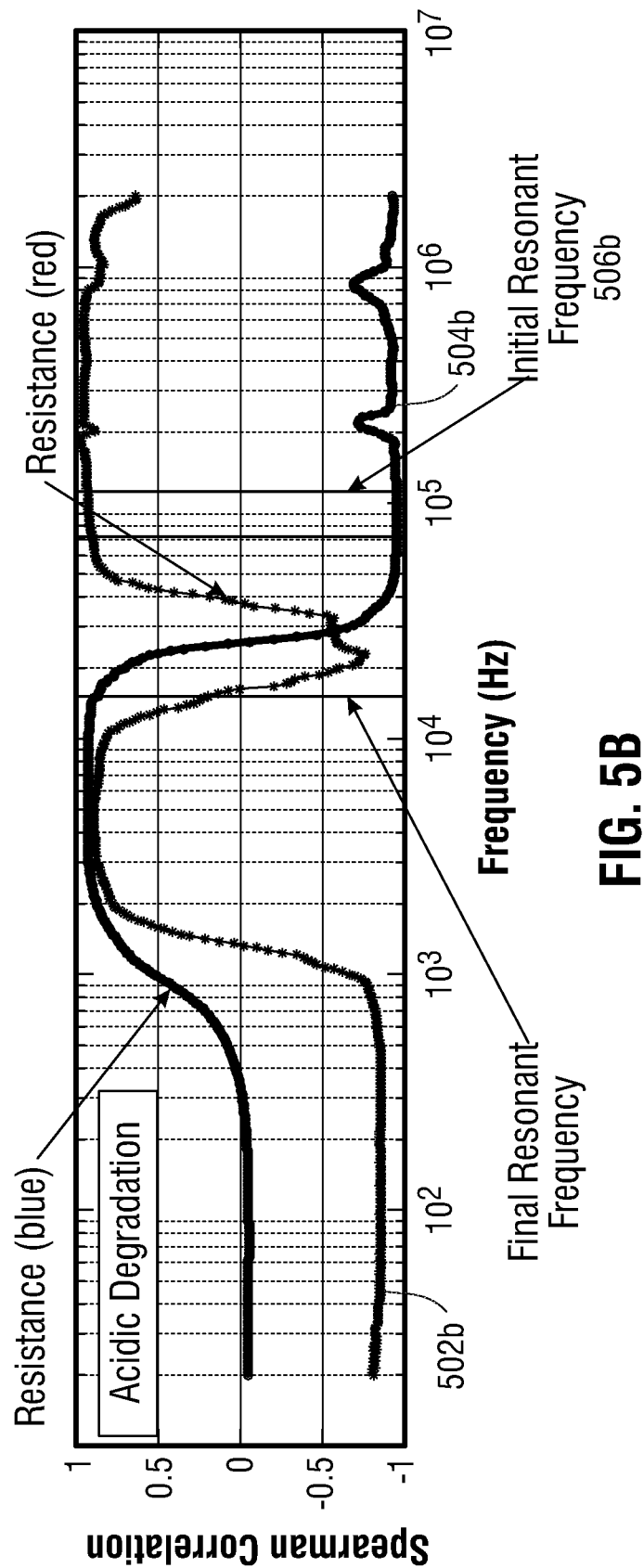
FIG. 5B illustrates a Spearman correlation spectrum plots for acidic degradation showing the differences in the frequency specific directional changes of the resistance and reactance terms.

By correlating the time series of impedance measurements at each frequency with time, impedance frequency-correlation diagrams can be constructed, as shown in FIGS. 5A and 5B. FIGS. 5A and 5B present data from a pair of experiments in which two electromagnetic coils were separately exposed to an elevated temperature environment (see FIG. 5A) and an acidic environment (see FIG. 5B) while measuring their impedance spectra. Several differences between the two aging conditions are observable, and these differences can be used as the basis for health monitoring.

For the given example, the data is given as a vector of time entries and a matrix of impedance values that are time and frequency dependent:

$$t = [t_0 \ t_1 \ ... \ t_T] \qquad \text{Eq. 2}$$

$$Z(t,f) = \begin{bmatrix} Z(t_0,f_1) & Z(t_1,f_1) & ... & Z(t_T,f_1) \\ Z(t_0,f_2) & Z(t_1,f_2) & ... & Z(t_T,f_2) \\ \vdots & \vdots & \ddots & \vdots \\ Z(t_0,f_N) & Z(t_1,f_N) & ... & Z(t_T,f_N) \end{bmatrix}$$

The computation would take the correlation between the time vector and each row of the impedance matrix. Hence, the output of the computation is a vector that is the same length as the number of frequency measurements, N, where each entry is a Spearman correlation coefficient describing the monotonicity of any given impedance measurement at a particular frequency over the degradation time period. This can be named as a "Spearman correlation spectrum".

FIGS. 5A and 5B illustrate Spearman correlation spectrum plots for temperature degradation (see FIG. 5A) and acidic degradation (see FIG. 5B) showing the differences in the frequency specific directional migrations of the resistance and reactance terms. The Spearman correlation coefficient was used to evaluate the correlation of the time series associated with each frequency against the time of the test.

Using the Spearman correlation spectrum, time series at specific, highly-correlated frequencies can be extracted and used as features for diagnostic and prognostic purposes. More particularly, in FIG. 5A, for the case of temperature degradation, the Spearman correlation is plotted against the frequency in Hz. The reactance values are indicated in plot 502a and the resistance values are indicated in plot 504a. The resonant frequency 506a occurs around $7\text{-}8\times10^4$ Hz.

In FIG. 5B, for the case of acidic degradation, the Spearman correlation is also plotted against the frequency in Hz. The reactance values are indicated in plot 502b and the resistance values are indicated in plot 504b. The initial resonant frequency 506b occurs around $10^5$ Hz. The final resonant frequency 508b occurs around $2\times10^4$ Hz.

In FIGS. 6A-6D and 7A-7D, time series corresponding to highly correlated frequencies (close to ±1) for resistance ($\Re\{Z(w)\}$) and reactance ($\Im\{Z(w)\}$) are shown in order to demonstrate the efficacy of the method in locating health indicators.

Figure 6A:
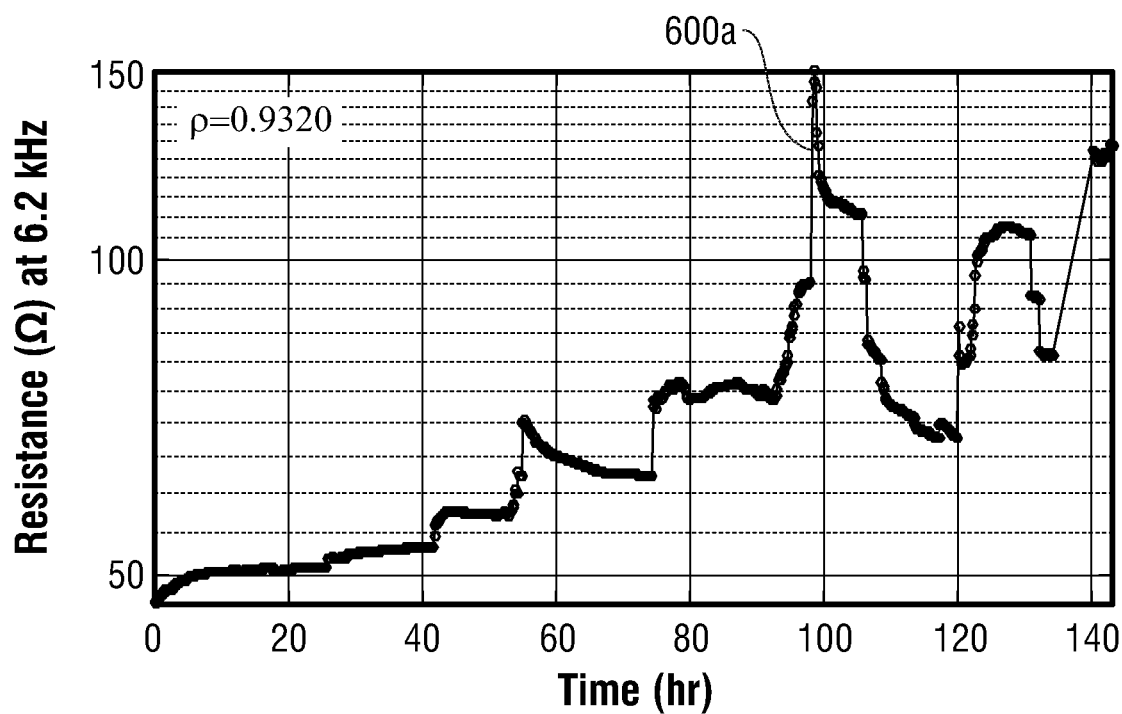
FIG. 6A is a graphical plot of resistance versus time resulting from a corrosive solvent experiment at 6.2 kHz.

More particularly, FIG. 6A is a graphical plot 600a of resistance versus time series resulting from a corrosive solvent experiment at 6.2 kHz.

Figure 6B:
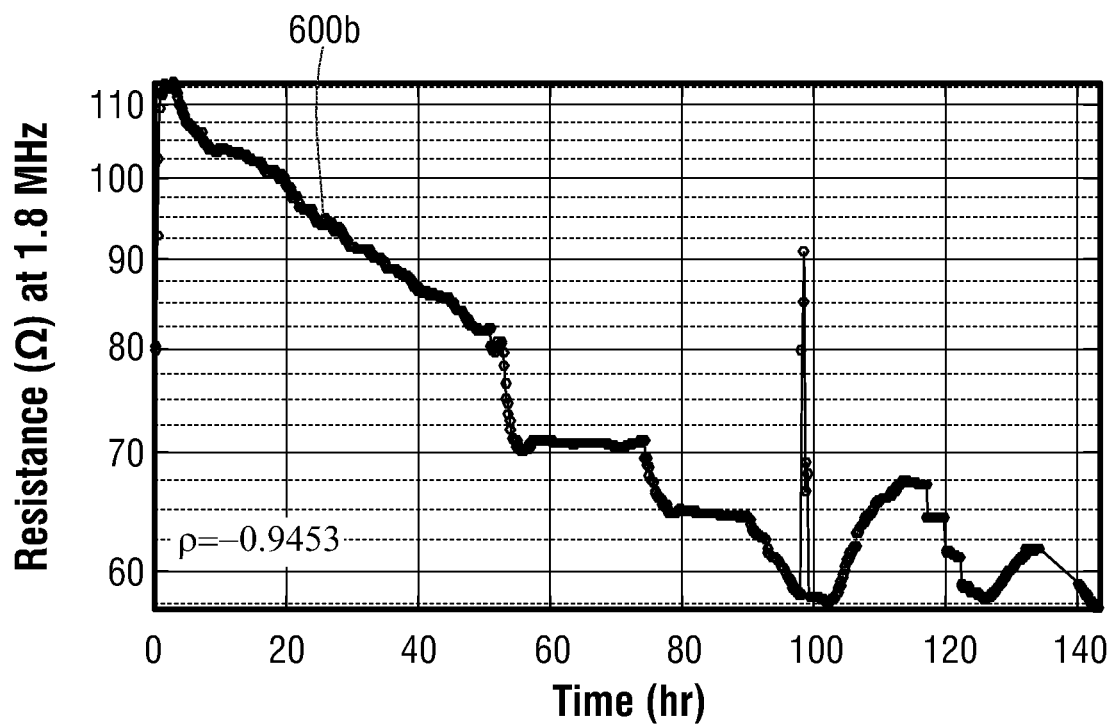
FIG. 6B is a graphical plot of resistance versus time resulting from the corrosive solvent experiment at 1.8 MHz.

FIG. 6B is a graphical plot 600b of resistance versus time series resulting from the corrosive solvent experiment at 1.8 MHz.

Figure 6C:
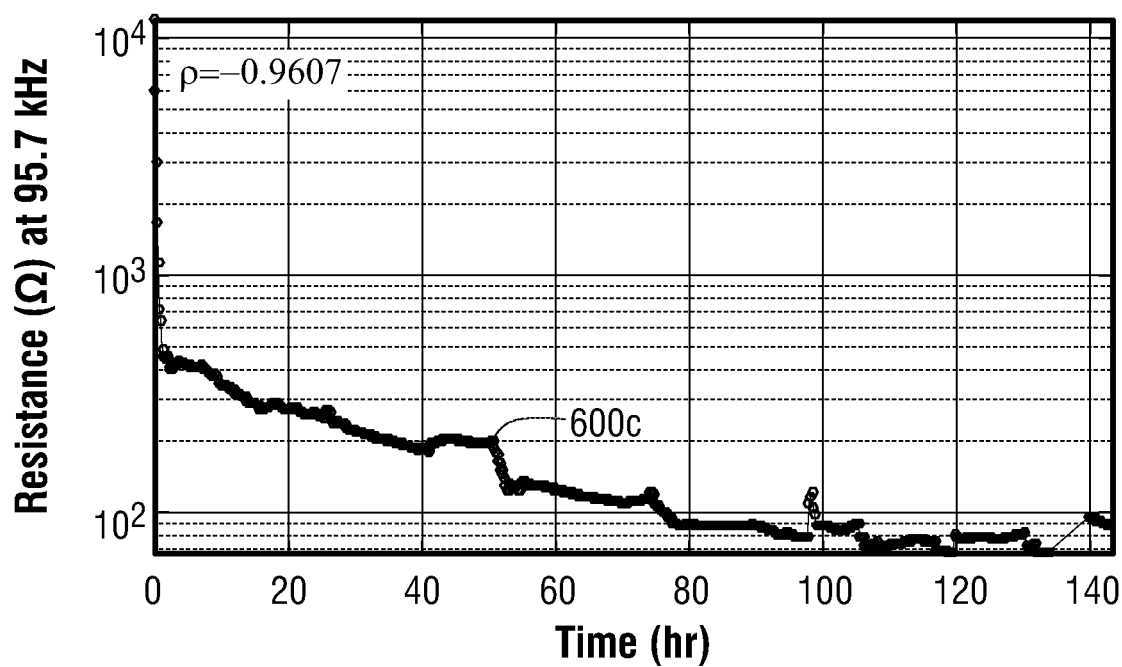
FIG. 6C is a graphical plot of resistance versus time resulting from the corrosive solvent experiment at 95.7 kHz.

FIG. 6C is a graphical plot 600c of resistance versus time series resulting from the corrosive solvent experiment at 95.7 kHz.

Figure 6D:
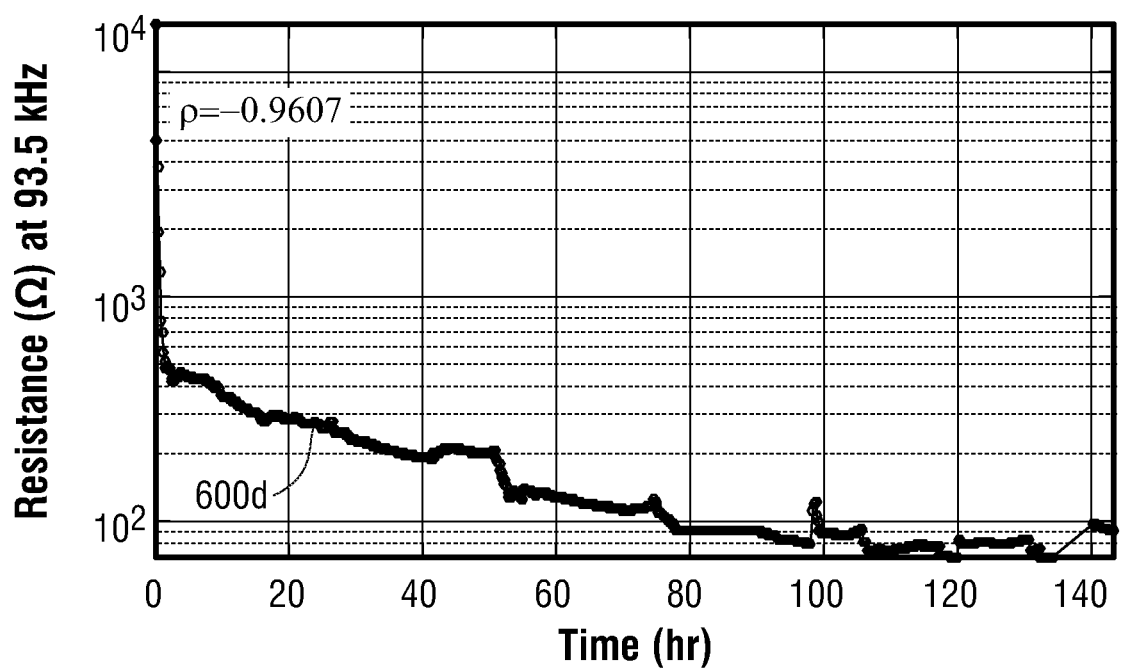
FIG. 6D is a graphical plot of resistance versus time resulting from the corrosive solvent experiment at 93.5 kHz.

FIG. 6D is a graphical plot 600d of resistance versus time series resulting from the corrosive solvent experiment at 93.5 kHz.

Figure 7A:
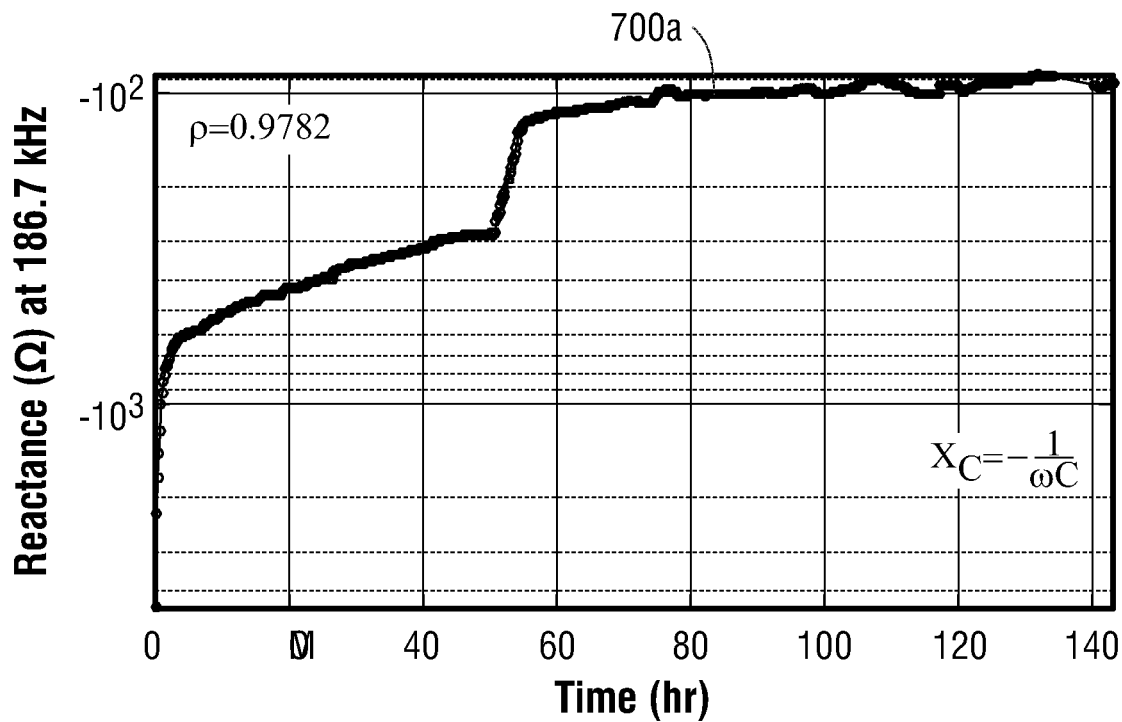
FIG. 7A is a graphical plot of reactance versus time resulting from a corrosive solvent experiment at 186.7 kHz.

FIG. 7A is a graphical plot 700a of reactance versus time series resulting from a corrosive solvent experiment at 186.7 kHz.

Figure 7B:
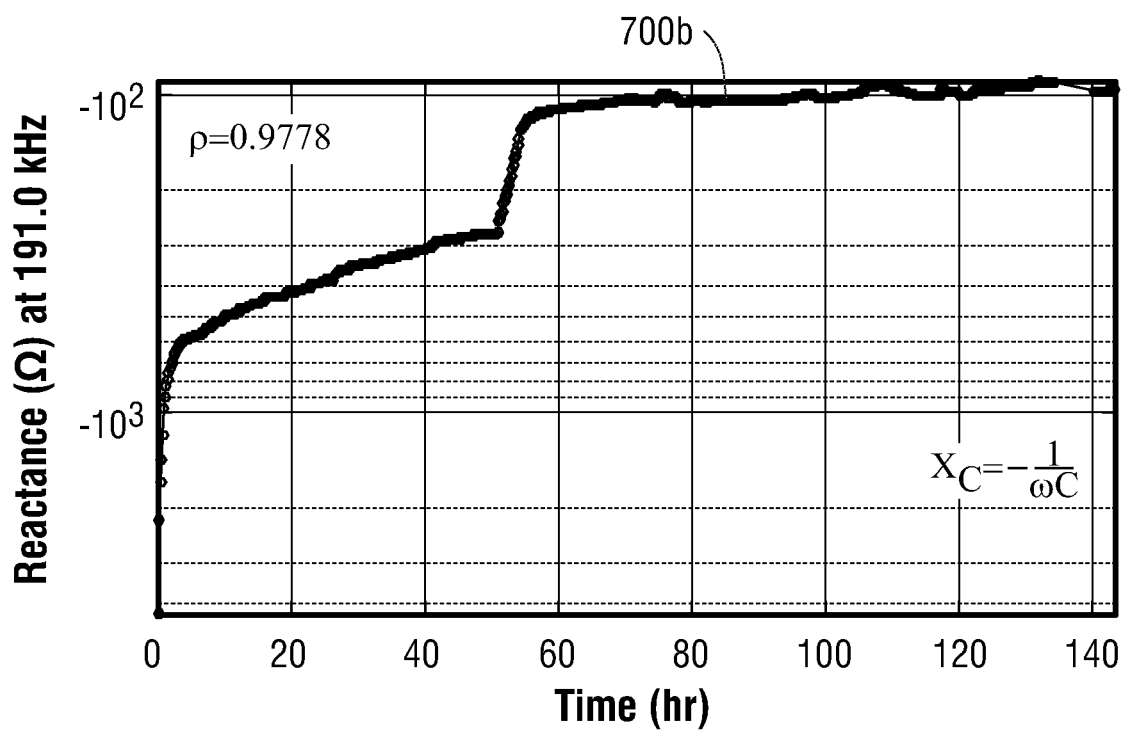
FIG. 7B is a graphical plot of reactance versus time resulting from the corrosive solvent experiment at 191.0 kHz.

FIG. 7B is a graphical plot 700b of reactance versus time series resulting from the corrosive solvent experiment at 191.0 kHz.

Figure 7C:
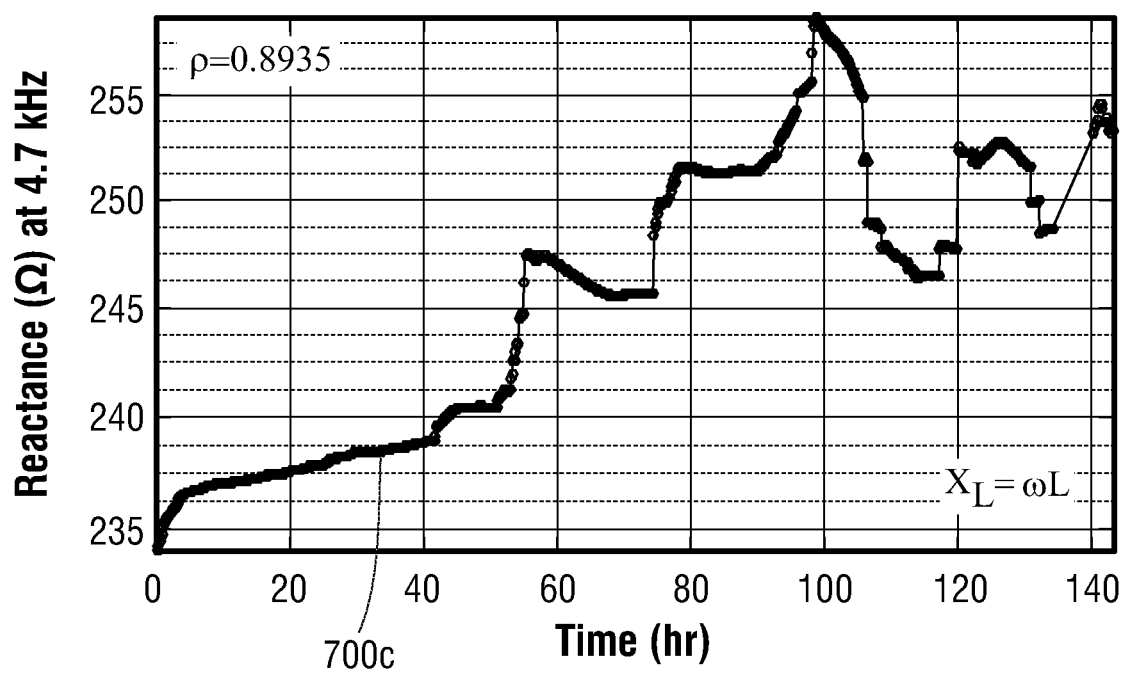
FIG. 7C is a graphical plot of reactance versus time resulting from the corrosive solvent experiment at 4.7 kHz.

FIG. 7C is a graphical plot 700c of reactance versus time series resulting from the corrosive solvent experiment at 4.7 kHz.

Figure 7D:
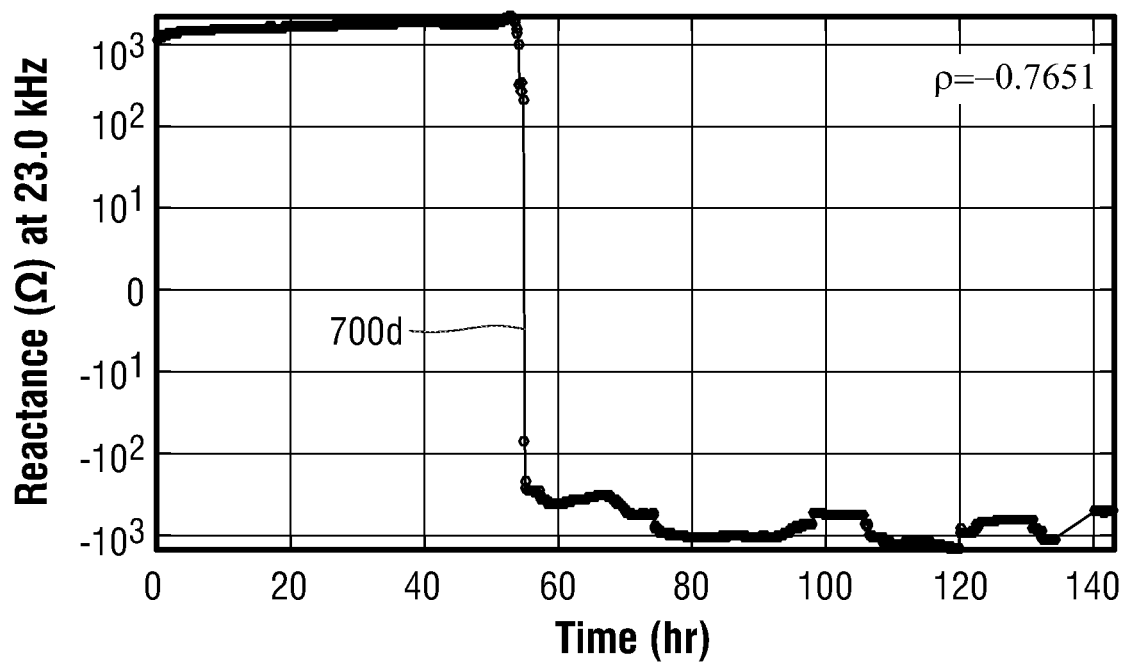
FIG. 7D is a graphical plot of reactance versus time resulting from the corrosive solvent experiment at 23.0 kHz.

FIG. 7D is a graphical plot 700d of reactance versus time series resulting from the corrosive solvent experiment at 23.0 kHz.

In order to demonstrate the method further, consider a solenoid valve electromagnetic coil that was aged for over 3000 hours at 80° C./50% RH (relative humidity). In a similar manner as the previous examples, the Spearman correlation spectrum was computed by correlating the degradation time with resistance ($\Re\{Z(w)\}$) and reactance ($\Im\{Z(w)\}$) at each measurement frequency.

Figure 8:
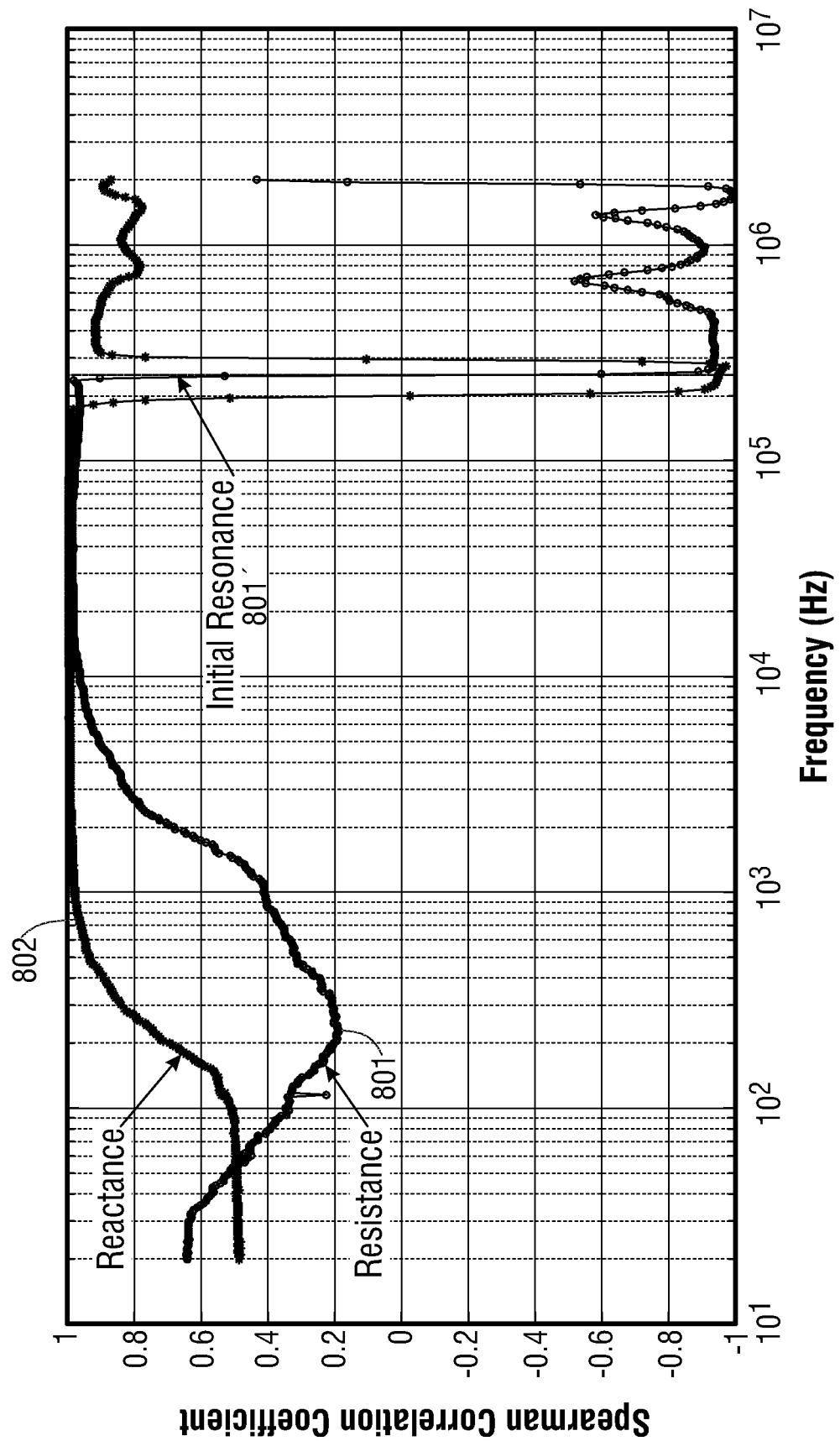
FIG. 8 is a graphical plot of the Spearman correlation coefficient for temperature-humidity aging using data prior to formation of a coil short in a solenoid-operated valve coil.

The Spearman correlation spectrum is shown in FIG. 8 The frequencies that are closer to ±1 should be chosen and used as health indicators for prognostic and diagnostic purposes.

FIG. 8 is a graphical plot of the Spearman correlation coefficient for temperature-humidity aging using data prior to formation of a coil short in a solenoid-operated valve coil aged at 80° C./50% RH. Graphical plot 801 indicates the Correlation Coefficient versus frequency in Hz for resistance. Initial resonance 801' occurs around $2\times10^5$ Hz.

Graphical plot 802 indicates the Correlation Coefficient versus frequency in Hz for reactance. The final resonant frequency is not shown because it is so close as to essentially overlap with the initial resonant frequency.

Example 2

A second example is realized in the area health monitoring of analog electrical circuits, as studied by Vasan et al. [2]. In their proposed method, features are extracted from the response of an analog circuit to a chirp signal, effectively probing the frequency response of the circuit between 1 kHz and 2 MHz. These features, wavelet coefficients and statistical features of kurtosis and entropy, are extracted in time and frequency domains, and can be computationally expensive. However, using our proposed method, the feature extraction is simple, computationally cheap, and easily visualized. Instead of extracting many features using multiple computational algorithms, we simplify the feature extraction by simply examining the time series at each frequency with the Spearman correlation coefficient. In the example from Vasan et al., it is clear that one using our proposed correlation analysis could find a highly-correlated feature to use as a fault indicator for diagnostic and prognostic purposes. The Spearman correlation spectrum for the degradation of two different capacitors is shown in FIG. 9.

Figure 9:
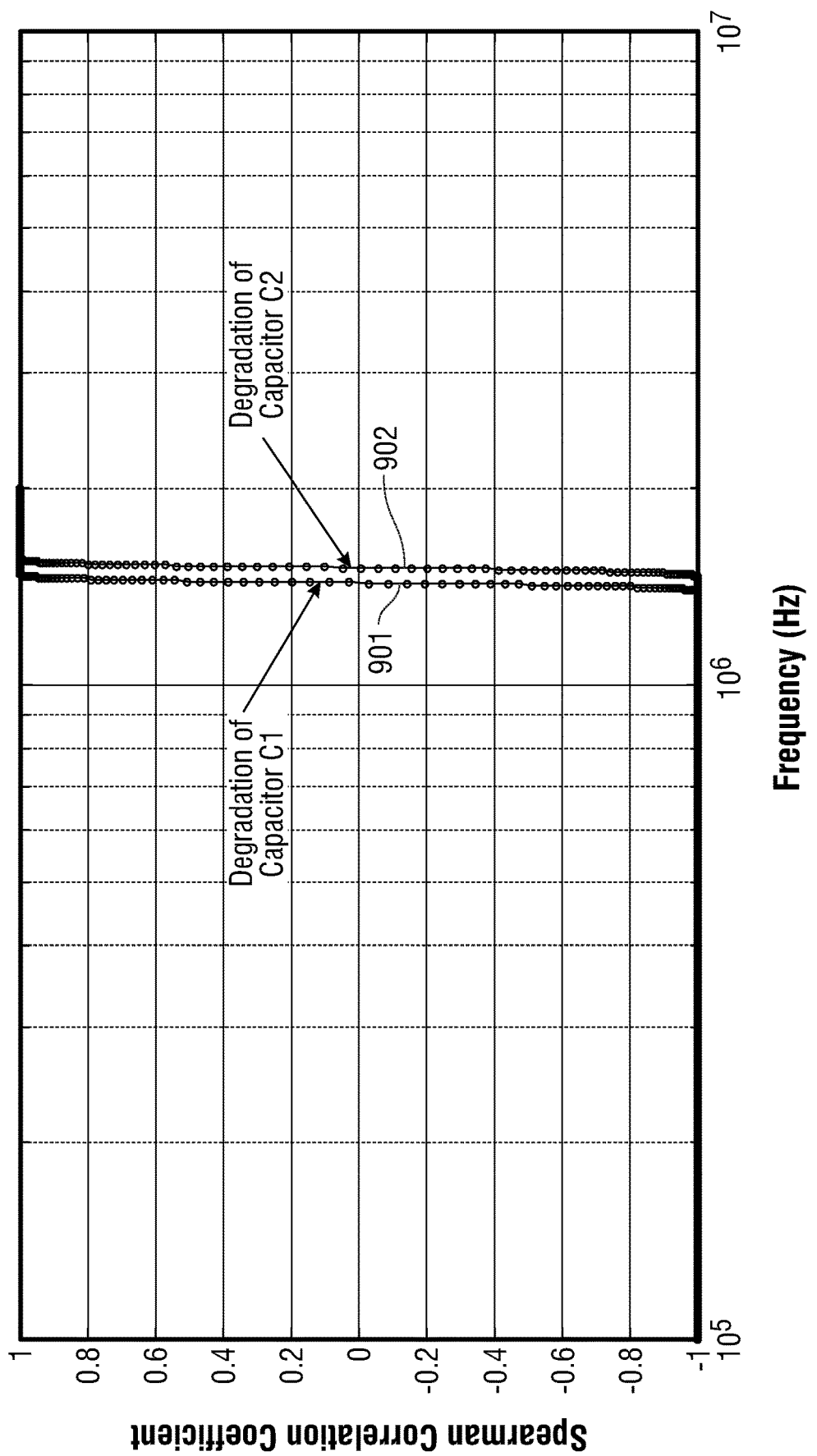
FIG. 9 is a graphical plot of the Spearman rank correlation spectrum for a circuit response as different capacitors degrade.

More particularly, FIG. 9 illustrates graphical plots 901 and 902 of the Spearman rank correlation spectrum for a circuit response as the different capacitors C1 and C2, respectively, degrade.

It should be clear to a person of skill in the art that these are merely examples and the embodiments and methodologies of the present disclosure have application in many other areas including: analog circuits; fans and motors; automotive systems; aerospace systems; rail transport systems; communication, networking, and computational systems; monitoring and predicting the health of living organisms as is done in human medicine. Significantly, one need not have technical knowledge of the physical operation of the system in order to apply the method and make decisions about health indicators. One need only examine the degradation data, compute the Spearman correlation coefficient for each potential health indicator, and then select those features which are closer to ±1. It is also clear to a person of skill in the art that the embodiments and methodologies of the present disclosure may be applied to numerous other areas either existing or to be developed that are not explicitly identified in the foregoing listing of areas of application.

While several embodiments and methodologies of the present disclosure have been described and shown in the drawings, it is not intended that the present disclosure be limited thereto, as it is intended that the present disclosure be as broad in scope as the art will allow and that the specification be read likewise. Therefore, the above description should not be construed as limiting, but merely as exemplifications of particular embodiments and methodologies. Those skilled in the art will envision other modifications within the scope of the claims appended hereto.

REFERENCES

[1] N. Jordan Jameson, Michael H. Azarian, and Michael Pecht, "Impedance-based condition monitoring for insulation systems used in low-voltage electromagnetic coils," IEEE Trans. Ind. Electron., vol. PP, no. 99, pp. 1-10, 2017.
[2] A. S. Sarathi Vasan, B. Long, and M. Pecht, "Diagnostics and Prognostics Method for Analog Electronic Circuits," IEEE Trans. Ind. Electron., vol. 60, no. 11, pp. 5277-5291, 2013.

What is claimed is:

1. A target system that is a target of health monitoring via a computational system, the target system comprising:
at least one sensor disposed on at least one of: the target system, a component of the target system, or a sub-component of the component of the target system; and
a computational system configure to monitor a health or condition over time, the computational system comprising:
a computing device including a processor and a memory storing instructions which, when executed by the processor, cause the computing device to, repeatedly:
acquire data over time from the at least one sensor;
generate at least two features based on the data acquired from the at least one sensor;
for each feature of the at least two features, determine a rank correlation coefficient indicative of rank correlation of the feature with time, including one of an increasing monotonic or a decreasing monotonic relationship, the time relating to at least one of aging time, degradation time, or usage time;
compute an absolute value of the rank correlation coefficient for each feature of the at least two features, confining a range of the absolute values of the rank correlation coefficients to 0 to 1, to provide absolute value rank correlation coefficients; and
monitor a health or condition of at least one of the target system, the component of the target system, or the sub-component of the component of the target system, based on a feature among the at least two features having a higher absolute value rank correlation coefficient relative to other features of the at least two features.

2. The target system according to claim 1, wherein the at least two features include at least two different frequency components,
wherein each rank correlation coefficient indicates rank correlation of a respective frequency component with at least one of usage time, aging time, or degradation time, and
wherein monitoring the health or condition is based on the frequency component among the at least two frequency components having the highest absolute value rank correlation coefficient relative to other frequency components of the at least two frequency components.

3. The target system according to claim 1, wherein the rank correlation coefficients are Spearman rank correlation coefficients.

4. The target system according to claim 1, wherein the target system includes an electrical system, or an electromechanical system, or a mechanical system or an assembly of components or sub-components or combinations thereof.

5. The target system according to claim 4, wherein the electrical system, or electromechanical system, or mechanical system or assembly of components or sub-components includes an aerospace structure or a maritime structure or combinations thereof.

6. The target system according to claim 5, wherein the aerospace structure includes an aircraft, or a missile, or a helicopter, or a drone and wherein the maritime structure includes a boat, or a surface ship, or a submarine, or a barge, or a water vessel or combinations thereof.

7. The target system according to claim 1, wherein the target system includes a civil structure.

8. The target system according to claim 7, wherein the civil structure includes a road, or a building, or a bridge or combinations thereof.

9. The target system according to claim 1, wherein the target system includes a bio-organism.

10. The target system according to claim 1, wherein the instructions, when executed by the processor, further cause the computing device to:

apply the feature with a higher relative absolute value rank correlation coefficient as a health or condition indicator chosen for at least one of the target system, the component of the target system, or the sub-component of the component of the target system to monitor as a health indicator for at least one of at least one other target system, at least one other component of the at least one other target system, or at least one other sub-component of the at least one other component of the at least one other target system, wherein the at least one of the at least one other target system, at least one other component of the at least one other target system, or at least one other sub-component of the at least one other component of the at least one other target system is analogous to but distinct from the at least one of the target system, the component of the target system, or the sub-component of the component of the target system for which the at least one feature with a higher relative absolute value rank correlation coefficient as a health or condition indicator was chosen.

11. A computational system for health monitoring over time of a target system, the computational system comprising:
at least one sensor disposed on at least one of: a target system, a component of the target system, or a sub-component of the component of the target system; and
a computing device including a processor and a memory storing instructions which, when executed by the processor, cause the computing device to, repeatedly:
acquire data over time from the at least one sensor;
generate at least two features based on the data acquired from the at least one sensor;
for each feature of the at least two features, determine a rank correlation coefficient indicative of rank correlation of the feature with time, including one of an increasing monotonic or a decreasing monotonic relationship, the time relating to at least one of aging time, degradation time, or usage time;
compute an absolute value of the rank correlation coefficient for each feature of the at least two features, confining a range of the absolute values of the rank correlation coefficients to 0 to 1, to provide absolute value rank correlation coefficients; and
monitor a health or condition of at least one of the target system, the component of the target system, or the sub-component of the component of the target system, based on a feature among the at least two features having a higher absolute value rank correlation coefficient relative to other features of the at least two features.

12. The computational system according to claim 11, wherein the at least two features include at least two different frequency components,
wherein each rank correlation coefficient indicates rank correlation of a respective frequency component with at least one of usage time, aging time, or degradation time, and
wherein monitoring the health or condition is based on the frequency component among the at least two frequency components having the highest absolute value rank correlation coefficient relative to other frequency components of the at least two frequency components.

13. The computational system according to claim 11, wherein the rank correlation coefficients are Spearman rank correlation coefficients.

14. The computational system according to claim 11, wherein the target system includes an electrical system, or an electromechanical system, or a mechanical system or an assembly of components or sub-components or combinations thereof.

15. The computational system according to claim 14, wherein the electrical system, or electromechanical system, or mechanical system or assembly of components or sub-components includes an aerospace structure or a maritime structure or combinations thereof.

16. The computational system according to claim 15, wherein the aerospace structure includes an aircraft, or a missile, or a helicopter, or a drone and wherein the maritime structure includes a boat, or a surface ship, or a submarine, or a barge, or a water vessel or combinations thereof.

17. The computational system according to claim 11, wherein the target system includes a civil structure.

18. The computational system according to claim 17, wherein the civil structure includes a road, or a building, or a bridge or combinations thereof.

19. The computational system according to claim 11, wherein the target system includes a bio-organism.

20. The computational system according to claim 11, wherein the instructions, when executed by the processor, further cause the computing device to:
apply the feature with a higher relative absolute value rank correlation coefficient as a health or condition indicator chosen for at least one of the target system, the component of the target system, or the sub-component of the component of the target system to monitor as a health indicator for at least one of at least one other target system, at least one other component of the at least one other target system, or at least one other sub-component of the at least one other component of the at least one other target system,
wherein the at least one of the at least one other target system, or at least one other component of the at least one other target system or at least one other sub-component of the at least one other component of the at least one other target system is analogous to but distinct from the at least one of the target system, the component of the target system, or the sub-component of the component of the target system for which the at least one feature with a higher relative absolute value rank correlation coefficient as a health or condition indicator was chosen.

21. A non-transitory computer-readable storage medium including instructions which, when executed by a computer, cause the computer to perform a health monitoring method over time of a target system, the health monitoring method comprising, repeatedly:
acquiring data over time from at least one sensor disposed on at least one of: a target system, a component of the target system, or a sub-component of the component of the target system;
generating at least two features based on the data acquired from the at least one sensor;
for each feature of the at least two features, determining a rank correlation coefficient indicative of rank correlation of the feature with time, including one of an increasing monotonic or a decreasing monotonic relationship, the time relating to at least one of aging time, degradation time, or usage time;
computing an absolute value of the rank correlation coefficient for each feature of the at least two features, confining a range of the absolute values of the rank correlation coefficients to 0 to 1, to provide absolute value rank correlation coefficients; and monitoring a health or condition of at least one of the target system, the component of the target system, or the sub-component of the component of the target system, based on a feature among the at least two features having a higher absolute value rank correlation coefficient relative to other features of the at least two features.

22. The non-transitory computer-readable storage medium according to claim 21, wherein the at least two features include at least two different frequency components, wherein each rank correlation coefficient indicates rank correlation of a respective frequency component with at least one of usage time, aging time, or degradation time, and wherein monitoring the health or condition is based on the frequency component among the at least two frequency components having the highest absolute value rank correlation coefficient relative to other frequency components of the at least two frequency components.

23. The non-transitory computer-readable storage medium according to claim 21, wherein the rank correlation coefficients are Spearman rank correlation coefficients.

24. The non-transitory computer-readable storage medium according to claim 21, wherein the acquiring of data from the at least one of the target system, the component of the target system, or the sub-component of the component of the target system.

25. The non-transitory computer-readable storage medium according to claim 24, wherein the acquiring of data from an electrical system, or from an electromechanical system, or from a mechanical system or from an assembly of components or sub-components includes acquiring data from an aerospace structure or a maritime structure or combinations thereof.

26. The non-transitory computer-readable storage medium according to claim 25, wherein the acquiring data from an aerospace structure includes acquiring data from an aircraft, or a missile, or a helicopter, or a drone and wherein the acquiring data from a maritime structure includes acquiring data from a boat, or a surface ship, or a submarine, or a barge, or a water vessel or combinations thereof.

27. The non-transitory computer-readable storage medium according to claim 21, wherein the acquiring of data from the at least one of the target system, the component of the target system, or the sub-component of the component of the target system includes acquiring of data from a civil structure.

28. The non-transitory computer-readable storage medium according to claim 27, wherein the acquiring of data from a civil structure includes acquiring of data from a road, or a building, or a bridge or combinations thereof.

29. The non-transitory computer-readable storage medium according to claim 21, wherein the acquiring of data from the at least one of the target system, the component of the target system, or the sub-component of the component of the target system includes acquiring of data from a bio-organism.

30. The non-transitory computer-readable storage medium according to claim 21, wherein the health monitoring method further comprises:

applying the feature with a higher relative absolute value rank correlation coefficient as a health or condition indicator chosen for at least one of the target system, the component of the target system, or the sub-component of the component of the target system to monitor as a health indicator for at least one of at least one other target system, at least one other component of the at least one other target system, or at least one other sub-component of the at least one other component of the at least one other target system, wherein the at least one of at least one other target system, at least one other component of the at least one other target system, or at least one other sub-component of the at least one other component of the at least one other target system is analogous to but distinct from the at least one of the target system, the component of the target system, or the sub-component of the component of the target system for which the at least one feature with a higher relative absolute value rank correlation coefficient as a health or condition indicator was chosen.

31. The non-transitory computer-readable storage medium according to claim 21, wherein the non-transitory computer readable storage medium resides on a system that is a target of health monitoring via the instructions when executed by the computer.

32. A method for health monitoring over time of a target system, the method comprising, repeatedly:

acquiring data over time from at least one sensor disposed on at least one of: a target system, a component of the target system, or a sub-component of the component of the target system;

generating at least two features based on the data acquired from the at least one sensor;

for each feature of the at least two features, determining a rank correlation coefficient indicative of rank correlation of the feature with time, including one of an increasing monotonic or a decreasing monotonic relationship, the time relating to at least one of aging time, degradation time, or usage time;

computing an absolute value of the rank correlation coefficient for each feature, confining a range of the absolute values of the rank correlation coefficients to 0 to 1, to provide absolute value rank correlation coefficients; and monitoring a health or condition of the at least one of the target system, the component of the target system, or the sub-component of the component of the target system, based on a feature among the at least two features having a higher absolute value rank correlation coefficient relative to other features of the at least two features.

33. The method according to claim 32, wherein the at least two features include at least two different frequency components, wherein each rank correlation coefficient indicates rank correlation of a respective frequency component with at least one of usage time, aging time, or degradation time, and wherein monitoring the health or condition is based on the frequency component among the at least two frequency components having the highest absolute value rank correlation coefficient relative to other frequency components of the at least two frequency components.

34. The method according to claim 32, wherein the rank correlation coefficients are Spearman rank correlation coefficients.

35. The method according to claim 32, wherein the acquiring of data from the at least one of the target system, the component of the target system, or the sub-component of the component of the target system includes acquiring of data from an electrical system, or from an electromechanical system, or from a mechanical system or from an assembly of components or sub-components or combinations thereof.

36. The method according to claim 35, wherein the acquiring of data from an electrical system, or from an electromechanical system, or from a mechanical system or from an assembly of components or sub-components includes acquiring data from an aerospace structure or a maritime structure or combinations thereof.

37. The method according to claim 36, wherein the acquiring data from an aerospace structure includes acquiring data from an aircraft, or a missile, or a helicopter, or a drone and wherein the acquiring data from a maritime structure includes acquiring data from a boat, or a surface ship, or a submarine, or a barge, or a water vessel or combinations thereof.

38. The method according to claim 32, wherein the acquiring of data from the at least one of the target system, the component of the target system, or the sub-component of the component of the target system includes acquiring of data from a civil structure.

39. The method according to claim 38, wherein the acquiring of data from a civil structure includes acquiring of data from a road, or a building, or a bridge or combinations thereof.

40. The method according to claim 32, wherein the acquiring of data from the at least one of the target system, the component of the target system, or the sub-component of the component of the target system includes acquiring of data from a bio-organism.

41. The method according to claim 32, further comprising:
applying the feature with a higher relative absolute value rank correlation coefficient as a health or condition indicator chosen for at least one of the target system, the component of the target system, or the sub-component of the component of the target system to monitor as a health indicator for at least one of at least one other target system, at least one other component of the at least one other target system, or at least one other sub-component of the at least one other component of the at least one other target system,
wherein the at least one of the at least one other target system, at least one other component of the at least one other target system, or at least one other sub-component of the at least one other component of the at least one other target system is analogous to but distinct from the at least one of the target system, the component of the target system, or the sub-component of the component of the target system for which the at least one feature with a higher relative absolute value rank correlation coefficient as a health or condition indicator was chosen.

* * * * *